US008180921B2

(12) United States Patent
Maynard (10) Patent No.: US 8,180,921 B2
(45) Date of Patent: May 15, 2012

(54) METHOD AND APPARATUS FOR LOAD BALANCING

(75) Inventor: William Pat Maynard, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 2073 days.

(21) Appl. No.: 10/157,623

(22) Filed: May 28, 2002

(65) Prior Publication Data

US 2002/0194335 A1 Dec. 19, 2002

Related U.S. Application Data

(60) Provisional application No. 60/299,494, filed on Jun. 19, 2001.

(51) Int. Cl.
*G06F 15/173* (2006.01)
*G06F 15/16* (2006.01)
*G06F 9/46* (2006.01)

(52) U.S. Cl. ......... 709/241; 709/225; 709/232; 718/105
(58) Field of Classification Search ............... 709/225, 709/232, 241, 238; 718/105
See application file for complete search history.

(56) References Cited

U.S. PATENT DOCUMENTS

| | | | | |
|---|---|---|---|---|
| 6,092,178 A * | 7/2000 | Jindal et al. | ...................... | 712/27 |
| 6,128,644 A * | 10/2000 | Nozaki | ........................... | 709/203 |
| 6,263,368 B1 * | 7/2001 | Martin | ........................... | 709/224 |
| 6,389,448 B1 * | 5/2002 | Primak et al. | .................. | 718/105 |
| 6,658,473 B1 * | 12/2003 | Block et al. | ..................... | 709/226 |
| 6,671,259 B1 * | 12/2003 | He et al. | ........................... | 370/238 |
| 6,754,699 B2 * | 6/2004 | Swildens et al. | .............. | 709/217 |
| 6,779,017 B1 * | 8/2004 | Lamberton et al. | ............ | 709/203 |
| 6,810,411 B1 | 10/2004 | Coughlin et al. | | |
| 6,832,355 B1 * | 12/2004 | Duperrouzel et al. | ......... | 715/788 |
| 6,856,991 B1 * | 2/2005 | Srivastava | ......................... | 707/10 |
| 7,028,083 B2 * | 4/2006 | Levine et al. | ................... | 709/223 |
| 7,082,476 B1 * | 7/2006 | Cohen et al. | ................... | 709/246 |
| 7,779,068 B2 * | 8/2010 | Li et al. | ........................... | 709/203 |
| 2001/0049741 A1 * | 12/2001 | Skene et al. | .................... | 709/232 |
| 2005/0033858 A1 * | 2/2005 | Swildens et al. | .............. | 709/232 |

OTHER PUBLICATIONS

M. Colajanni, et al., 'Analysis of Task Assignment Policies in Scalable Distributed Web-Server Systems,' IEEE Transactions on Parallel and Distributed Systems, vol. 9, No. 6, pp. 585-600 Jun. 1998.

* cited by examiner

*Primary Examiner* — Asghar Bilgrami (57) ABSTRACT

A method and apparatus is provided in which a multi-site load balancing system directs a client to a site best able to respond to the client's request based on a combination of balancing methods. Performance metric balancing is employed to select sites having the best performance metrics to participate in network latency balancing to determine the site best able to respond the request. The sites participating in the network latency balancing are selected based on having performance metrics within an allowable deviation of the best performance metric. Alternatively, network latency balancing is employed to select sites having the least network latency to participate in performance metric balancing to determine the site best able to respond to the request.

4 Claims, 7 Drawing Sheets

METHOD AND APPARATUS FOR LOAD BALANCING

CROSS-REFERENCE TO RELATED APPLICATIONS

This application claims priority based on U.S. Provisional Application 60/299,494, entitled "Combining Performance Metrics and Network Latency for Multi-Site Load Balancing," filed on Jun. 19, 2001, by William Pat Maynard.

TECHNICAL FIELD

This invention relates to servers in networks. In particular, the invention relates to balancing the traffic load among servers in a network.

BACKGROUND

Many sites on the Internet are not always as simple in their implementation as they appear to be to the user. Often what appears to be a single site on a single computer is actually a collection of servers on a Local Area Network (LAN). This collection of servers is commonly referred to as a server farm. The server farm frequently has more than one connection to the Internet to further ensure that the site does not have a single point of failure to the outside world. Sometimes these additional connections are actually mirrored sites located at different geographic locations.

The purpose of the server farm is to provide enough raw computing power for a site so that it does not get overwhelmed when the traffic is heavy. Many server farm sites use LAN load balancers to ensure that the traffic load is evenly balanced among all of the servers in the farm. The LAN load balancers present a single Virtual Internet Protocol address (VIP) to the outside world for the site, where the single VIP address represents a virtual site comprising all of the servers in the farm.

LAN load balancers typically use performance metrics of the individual servers along with the requested service's availability information to direct each connection to a server in the virtual site that can best fulfil a client's request. A service is defined as a process (application program) running on a server which is uniquely identified by the Internet Protocol (IP) address of the server and the service port that the process is listening on. For instance a HyperText Transport Protocol (HTTP) server running on a server with an IP address of 192.10.1.12, listens on port 80 and would be referred to as the service 192.10.1.12:80. Performance metrics are quantitative data about a particular server such as the number of connections to the server, or the load on the server's central processing unit (CPU), e.g., how much data are the clients transferring and how much additional processing must the server complete for each client request. The performance metrics often provide a better measure of the ability of the virtual site to satisfy a client request than service availability. For example, the ability to ping the server is not truly considered service availability (but is sometimes used) since the ability to ping a server does not mean that the service (such as HTTP) is actually available on that server. LAN load balancers typically use performance metrics to balance loads only among those sites where the service is available, since when the service is not available it is unlikely that performance metrics for the site can be obtained.

When the virtual site comprises multiple physical sites distributed across a Wide Area Network (WAN) multiple VIP addresses are required, with at least one VIP address is assigned to each physical site. A WAN or multi-site load balancer distributes the traffic load more evenly among the multiple physical sites. Unlike the LAN load balancers, the multi-site load balancers typically do not view server farms as individual servers. Instead, they view each server farm as a single site and attempt to balance the traffic to each site.

The most common implementation for multi-site load balancing is to load balance the Domain Name Service (DNS) requests for a host name. For example, when a client enters a uniform record locator (URL) on their web browser or clicks on a link, the client's name server must translate the host name in the URL into an Internet Protocol (IP) address. The DNS request works its way through the Internet until it eventually finds a name server that claims to have an authoritative answer for the request, at which point the request may be balanced.

Like the LAN balancers, WAN or multi-site load balancers attempt to direct each connection to the server that can best fulfill the DNS request, in this case by referring the client to a site that is capable of providing an optimal response. There are several factors that influence whether a site is capable of providing an optimal response. One factor is server response time, which is based on several factors, primarily the performance metrics of the servers that comprise the site. Another factor is network response time, which is based on network latency. Network latency is a measure of how quickly packets can reach the site through the network.

Prior art approaches to multi-site load balancing refer clients to sites having either the fastest server response times or the fastest network response times. However, those sites may not be the sites actually capable of providing the client with the optimal response.

The most common prior art approach to multi-site balancing refers clients to the best available site of the moment based on server response time. But load balancing based solely on server response time may break down completely when there are significant differences in the network response time between the client and each of the available sites. A site may have the best server response time but the slowest network response time. For example, a site with the best performance metrics might have an unacceptably slow 600 millisecond network latency, whereas another site with only marginally poorer performance metrics, but a significantly less network latency of 150 milliseconds, may be a better choice.

Another less commonly used prior art approach to multi-site balancing refers clients to the best available site of the moment based solely on network response time. But load balancing based solely on network response time may also be problematic, since the site with the least network latency may also be the most heavily loaded. Although the packet reaches the site quickly, the servers may be so overloaded that the server response time is totally unacceptable.

Another problem with load balancing based solely on network response time occurs when there is only one site available to respond. For example, multiple VIPs may be associated with the same site where the VIP addresses often correspond to the individual services available at that site (e.g. HTTP, HTTPS, FTP, etc . . . ). Since there is only one site, the prior art network latency load balancing approach defaults to using a round robin balancing of the VIP addresses mapped to the host name to return a random VIP address. But the randomly returned VIP address may not necessarily be the VIP address of the site capable of providing the optimal response.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following description various aspects of the present invention, a method and apparatus for multi-site load balancing, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well-known features may be omitted or simplified in order not to obscure the present invention.

Parts of the description will be presented using terminology commonly employed by those skilled in the art to convey the substance of their work to others skilled in the art, including terms of operations performed by a computer system and their operands, such as transmitting, receiving, retrieving, determining, generating, recording, storing, and the like. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, reference throughout this specification to "one embodiment," "an embodiment," or "an aspect," means that the particular feature, structure, or characteristic that is described is included in at least one embodiment of the invention, but not necessarily in the same embodiment. Furthermore, the particular features, structures, or characteristics may be combined in any suitable manner in one or more embodiments.

Figure 1:
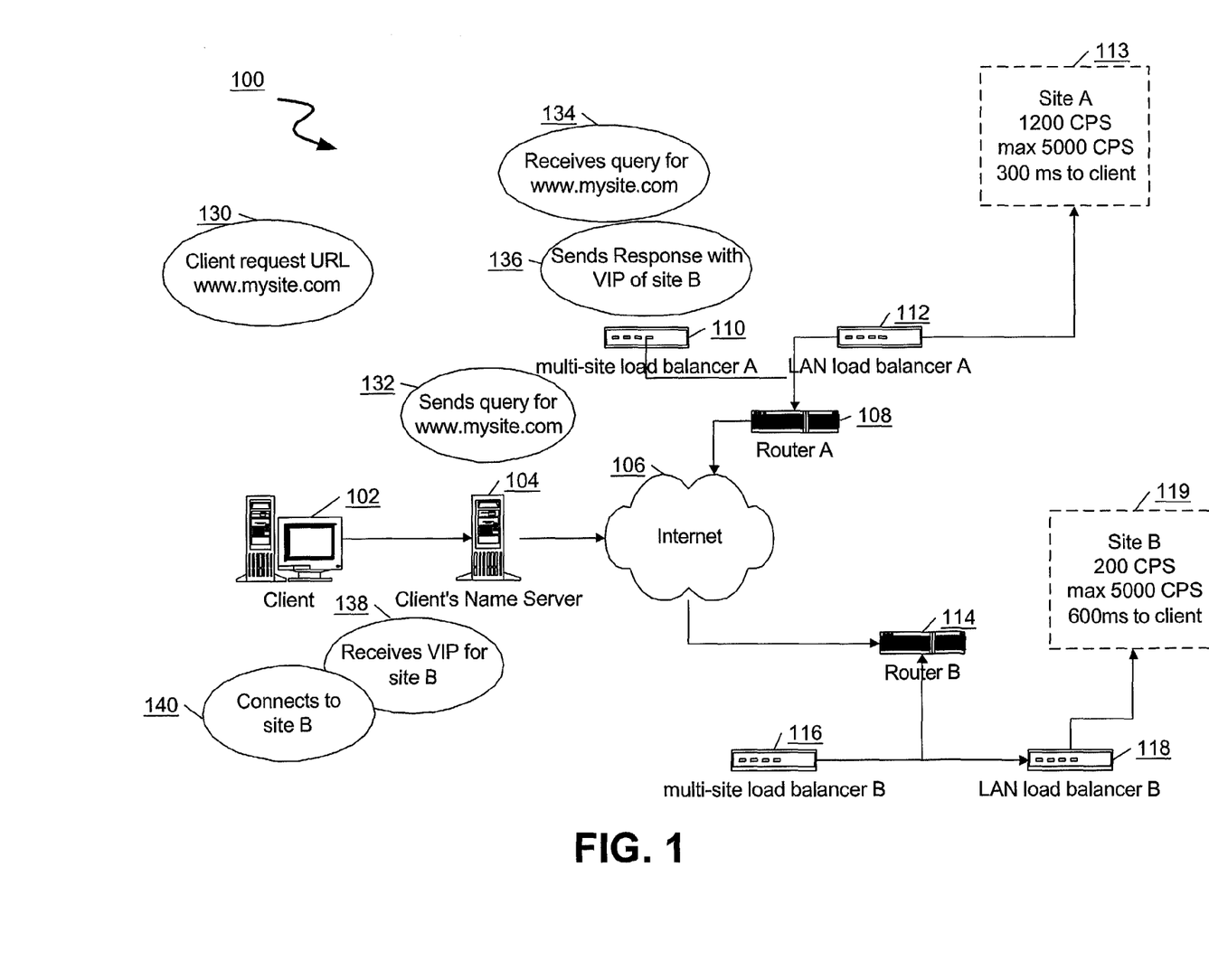
FIG. 1 is a diagram illustrating a generalized overview of the organization of a typical multi-site network and load balancing multiple sites based solely on performance metrics.

FIG. 1 is a diagram illustrating a generalized overview of the organization of a typical multi-site network and load balancing multiple sites based solely on performance metrics. A client 102, in communication with a client name server 104, connects to a multi-site network via a network such as the Internet 106. The multi-site network includes a router A 108 in communication with the Internet 106, and coupled with a multi-site load balancer A 110 and a LAN load balancer A 112. Similarly, the multi-site network further includes a router B 114 in communication with the Internet 106, and coupled with a multi-site load balancer B 116 and a LAN load balancer B 118. The LAN load balancers A and B 112/118 and routers A and B 108/114 perform load balancing and routing functions that are known in the art and will not be further described except as they pertain to an embodiment of the present invention.

The multi-site load balancers A and B 110/116 balance a client request to the URL www.mysite.com 130 using a performance metrics balancing method 100. The performance metrics provide a measure of the ability of the site A and B to satisfy the client request. In the illustrated example, site A operating characteristics 113 include performance metrics of 1200 connections per second (CPS) with a maximum service rate of 5000 CPS, and a network latency of 300 milliseconds to the client 102. Site B operating characteristics 119 include performance metrics of only 200 connections per second (CPS) with a maximum service rate of 5000 CPS, but a network latency of 600 milliseconds to the client 102. Therefore, although Site B has significantly better performance metrics than Site A, it has a significantly poorer network latency as compared to Site A. Each of the multi-site load balancers A and B 110/116 has access to the operating characteristics 113/119 for both site A and B.

The client 102 enters a URL of www.mysite.com at process 130, which results in a query typically in the form of a DNS request issued by the client name server 104 on behalf of the client 102. Each multi-site load balancer A and B 110/116 includes a domain name server that is capable of satisfying the DNS request. The client name server 104 attempts to resolve the DNS request by sending the request to one of the multi-site load balancers. Typically, the client name server 104 will use a round robin approach to choose which one of the multi-site load balancers to use. In the illustrated example, the client name server 104 sends the DNS request for www.mysite.com to multi-site load balancer A 110 via router A 108. The multi-site load balancer A 110/receives the request for www.mysite.com at 134. Based on a comparison of the performance metrics of site A 113 with the corresponding performance metrics of site B 119 (performance metrics of each site is accessible to each multi-site load balancer), multi-site load balancer A 110 domain name server returns a response at 136 identifying site B as the best available site for an optimal response, even though Site B currently has poorer network latency of 600 milliseconds. As a result, the client name server 104 receives at 138 the VIP identification (e.g., the VIP address) for Site B, and the client 102 connects at 140 to Site B.

Figure 2:
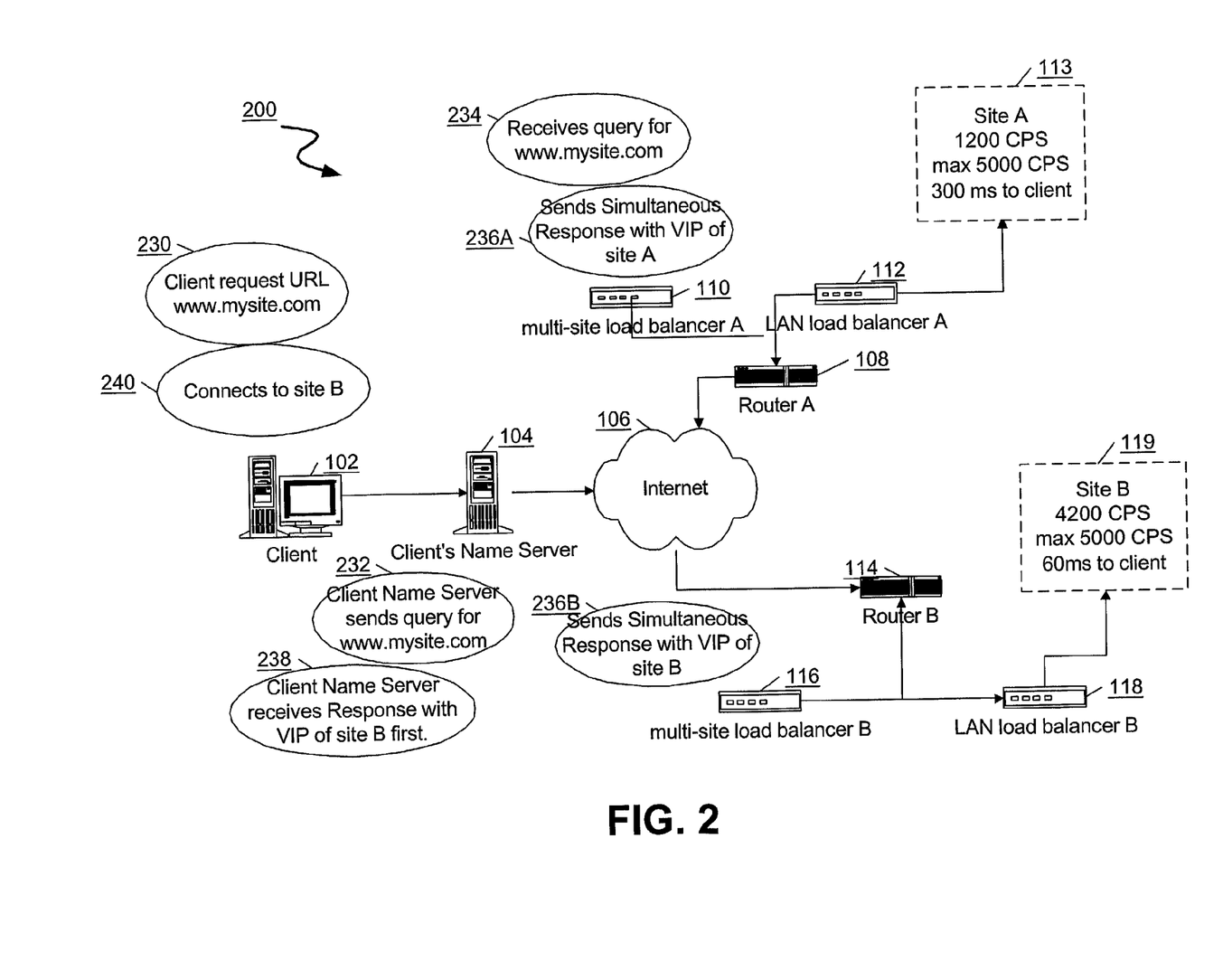
FIG. 2 is a diagram illustrating a generalized overview of the organization of a typical multi-site network and load balancing multiple sites based solely on network latency.

FIG. 2 is a diagram illustrating a generalized overview of the organization of a typical multi-site network and load balancing multiple sites based solely on network latency. As in FIG. 1, a client 102, in communication with a client name server 104, connects to a multi-site network via a network such as the Internet 106. The multi-site network includes a router A 108 in communication with the Internet 106, and coupled with a multi-site load balancer A 110 and a LAN load balancer A 112. Similarly, the multi-site network further includes a router B 114 in communication with the Internet 106, and coupled with a multi-site load balancer B 116 and a LAN load balancer B 118.

The multi-site load balancers A and B 110/116 balance a client request to the URL www.mysite.com 230 using a network latency balancing method 200. In the illustrated example, site A operating characteristics 113 are the same as in FIG. 1 and include performance metrics of 1200 connections per second (CPS) with a maximum service rate of 5000 CPS, and a network latency of 300 milliseconds to the client 102. In this case, however, Site B is more heavily loaded than before and has operating characteristics 119 that include performance metrics of 4200 connections per second (CPS) with a maximum service rate of 5000 CPS, but a network latency of only 60 milliseconds to the client 102. Therefore, although Site A is less heavily loaded and thus has significantly better performance metrics than Site B, Site A has a significantly poorer network latency as compared to Site B.

As in FIG. 1, the client 102 enters a URL of www.mysite.com at process 230, which results in a query typically in the form of a DNS request issued by the client name server 104 on behalf of the client 102. Each multi-site load balancer A and B 110/116 includes a domain name server that is capable of satisfying the DNS request. The client name server 104 attempts to resolve the DNS request by sending the request to one of the multi-site load balancers. As in FIG. 1, the client name server 104 will use a round robin approach to choose which one of the multi-site load balancers to use. In the illustrated example, the client name server 104 sends the DNS request for www.mysite.com to multi-site load balancer A 110 via router A 108. However, instead of just multi-site load balancer A 110 responding based on performance metrics determinations, both of the multi-site load balancers respond based on network latency. The multi-site load balancer A 110 receives the request for www.mysite.com at 234 and coordinates with multi-site load balancer B 116 so that the domain name servers on each of multi-site load balancer A 110 and multi-site load balancer B 116 respond at the same time. In the illustrated example, the domain name server on multi-site load balancer A 110 responds at 236A with a VIP for Site A. Likewise, the domain name server on multi-site load balancer B 116 responds simultaneously at 236B with a VIP for Site B. Since the network latency for Site B is only 50 milliseconds, the response from Site B reaches the client name server 104 well before the response from site A. This is true, in spite of the fact that Site B is heavily loaded with 4200 CPS, as the performance metrics are not taken into account. Consequently, even though Site B currently has poorer performance metrics of 4200 CPS, the client name server 104 receives at 238 the VIP for Site B, and therefore the client 102 connects at 240 to Site B. An example of a network latency balancing method 200 is described in commonly assigned co-pending U.S. patent application Ser. No. 09/394,227.

Figure 3:
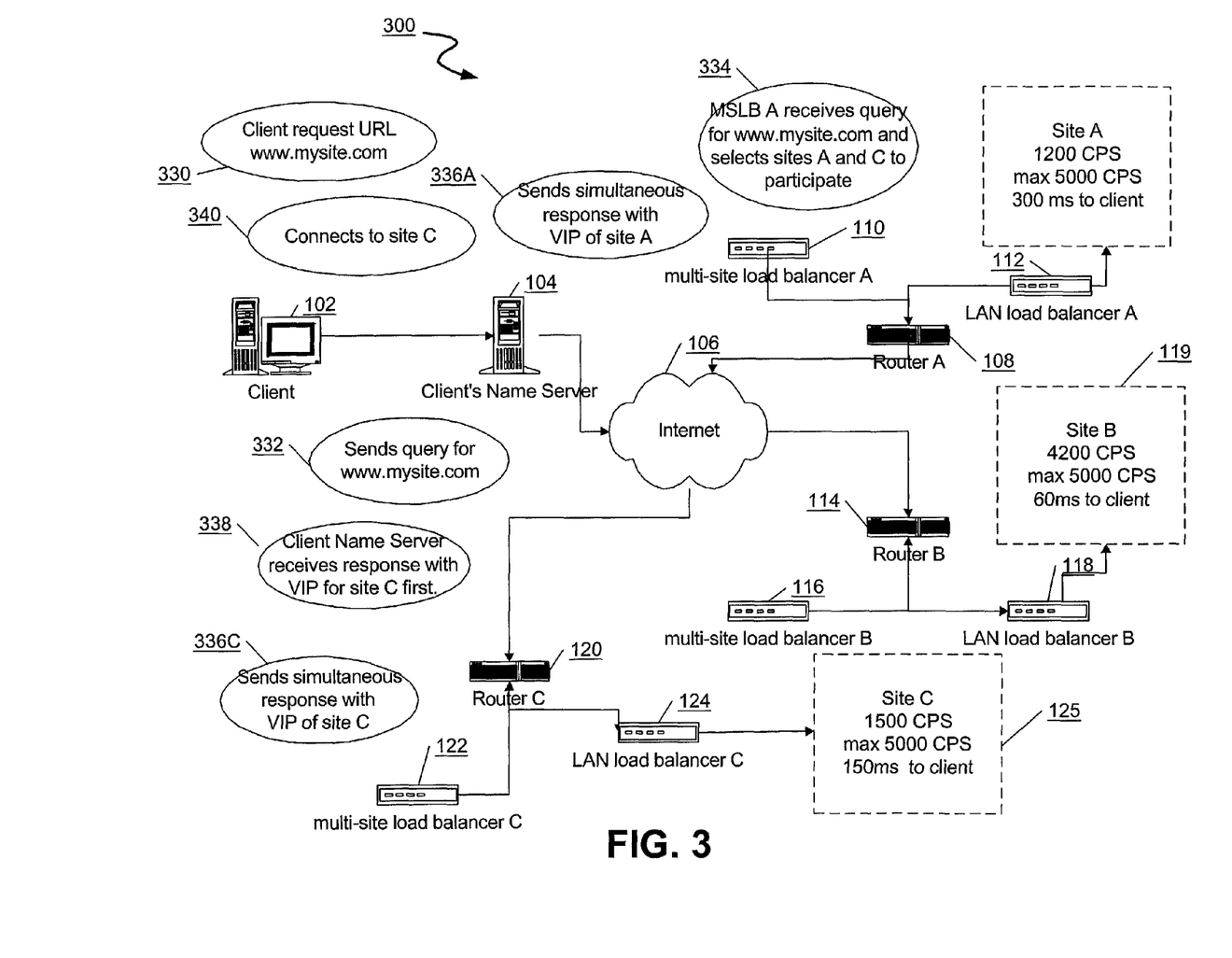
FIG. 3 is a block diagram illustrating one generalized embodiment of a multi-site network incorporating the invention, and in which certain aspects of the invention may be practiced.

FIG. 3 is a block diagram illustrating one generalized embodiment of a multi-site network incorporating the invention, and in which certain aspects of the invention may be practiced. As in FIGS. 1 and 2, a client 102, in communication with a client name server 104, connects to a multi-site network via a network such as the Internet 106. In one embodiment, the multi-site network includes a router A 108 in communication with the Internet 106, and coupled with a multi-site load balancer A 110 and a LAN load balancer A 112. Similarly, the multi-site network further includes a router B 114 in communication with the Internet 106, and coupled with a multi-site load balancer B 116 and a LAN load balancer B 118. In the illustrated embodiment, the multi-site network further includes a router C 120 in communication with the Internet 106, and coupled with a multi-site load balancer C 122 and a LAN load balancer C 124.

The multi-site load balancers A, B, and C 110/116/122 balance a client request to the URL www.mysite.com 330 using a multi-site load balancing system 300 in accordance with one embodiment of the present invention. In the illustrated embodiment, site A operating characteristics 113 are the same as in FIGS. 1 and 2 and include performance metrics of 1200 connections per second (CPS) with a maximum service rate of 5000 CPS, and a network latency of 300 milliseconds to the client 102. Site B operating characteristics 119 are the same as in FIG. 2—more heavily loaded than Site A with performance metrics of 4200 connections per second (CPS) with a maximum service rate of 5000 CPS, and a network latency of 60 milliseconds to the client 102. Site C operating characteristics 125 are between Site A and Site B. Site C is more heavily loaded than Site A but less than Site B, with performance metrics of 1500 connections per second (CPS) with a maximum service rate of 5000 CPS. In addition, Site C has a network latency of 150 milliseconds to the client 102—less than Site A, but greater than Site B.

When the load balancing based on performance metrics method 100 is applied, Site A would be the best site, but when the load balancing based on network latency 200 is applied, Site B would be the best site. Site C, however, is less heavily loaded than Site B and has significantly better network latency than Site A, and may, in fact, be better able to respond to the client 102 than either Site A or Site B. In one embodiment, the multi-site load balancing system 300 combines performance metrics with network latency balancing to better determine the site best able to respond to the client 102.

By itself, performance metric load balancing 100 always yields a single site as the result, whereas network latency balancing 200 generally uses all available sites. Combining the two methods depends on the premise that given any two metric values, there is an allowable deviation in values such that both metrics can be treated as being equal. In other words, if the difference between the two metric values is small enough the two values can be treated as if they were the same value. For example, with a maximum of 5000 CPS, the difference between 400 CPS and 450 CPS is only 1 percent and, depending on the application running on the multi-site network, the two values may be considered the same value for the purpose of making a balancing decision.

In one embodiment, in order to properly apply the network latency balancing aspect of the combined approach, at least two sites need to participate. The number of sites that participate in the network latency balancing aspect of the combined approach depends in part on the value of the allowable deviation. When the allowable deviation is too small there is a possibility that only the single site with best metric value may be used. However, when the allowable deviation is large enough there will usually be more than one site that participates in a network latency balancing response.

In the illustrated example shown in FIG. 3, Site B is heavily loaded, but the loading of the Sites A and C differs by only 6%. When the value of the allowed deviation is 10%, both sites A and C will participate in sending a network latency balancing response. As will be described, the response from Site C will arrive first because it has the lowest latency of the participating sites A and C.

Using the multi-site load balancing system 300 in accordance with one embodiment of the present invention, the client 102 enters a URL of www.mysite.com at process 330, which results in a query typically in the form of a DNS request. Each multi-site load balancer A, B, and C 110/116/122 includes a domain name server that is capable of satisfying the DNS request. The client name server 104 attempts to locate a server to satisfy the DNS request by sending the request to one of the multi-site load balancers A, B, and C 110/116/122 via routers A, B, and C 108/116/120 respectively. As before, the client name server 104 will typically use a round robin approach to choose which one of the multi-site load balancers to use. Based on a comparison of the performance metrics of Site A 113 with the corresponding performance metrics of Sites B and C 119/125, the multi-site load balancer that received the DNS request causes the multi-site load balancers A and C 110/122 return a response at 336A and 336C, respectively, identifying the VIP of their respective Sites A and C as the two available sites best able to respond to the client 102. Site B is dropped from consideration since Site B currently is carrying the highest connection load at 4200 CPS.

In one embodiment, the multi-site load balancer that received the DNS request further coordinates the responses at 336A and 336C so that the domain name servers on each of the identified sites A and C respond to the client name server 104 simultaneously. Since the network latency for Site C is only 150 milliseconds, the response from the domain name server on Site C reaches the client name server 104 well before the response from the domain name server on Site A. This is true, in spite of the fact that Site C is slightly more heavily loaded with 1500 CPS. As a result, the client name server 104 receives at 338 the VIP for Site C as the best available site, and therefore the client 102 connects at 340 to Site C to satisfy the client request.

It is understood by one of ordinary skill in the art, that other types of performance metrics may be employed without departing from the scope of the invention. For example, instead of quantifying the load on the server using the connections per second (CPS), the load on the server may be determined directly from the server response time measured in terms of the latency between the server's receipt of a request and the time the server actually sends a response to the request. As another example, the performance metrics may include a measure of bandwidth, where bandwidth is defined for quality of service purposes as is known in the art. The load on the server may be derived from the server's bandwidth utilization.

Figure 4:
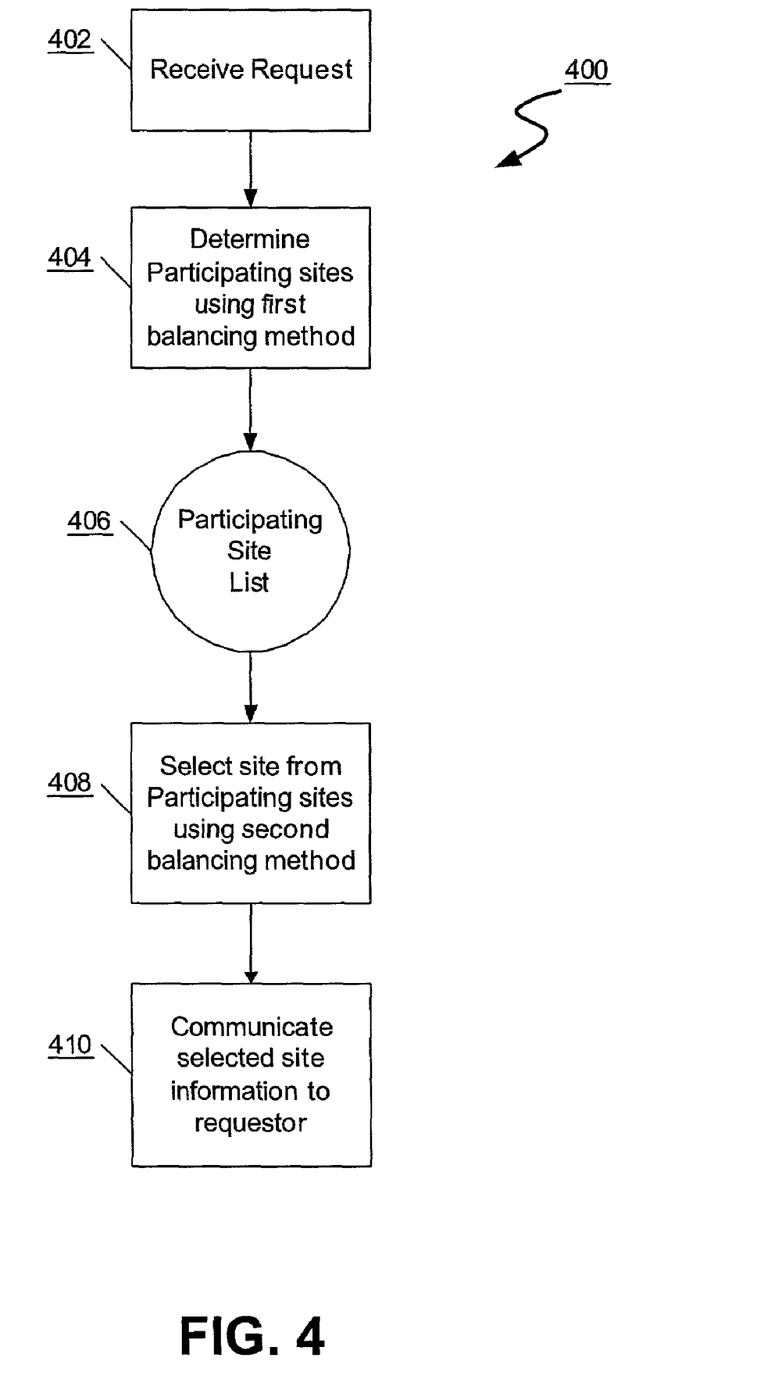
FIG. 4 is a flow diagram illustrating selected aspects of a method to be performed by a computing device executing one embodiment of the illustrated invention shown in FIG. 3.
Figure 5:
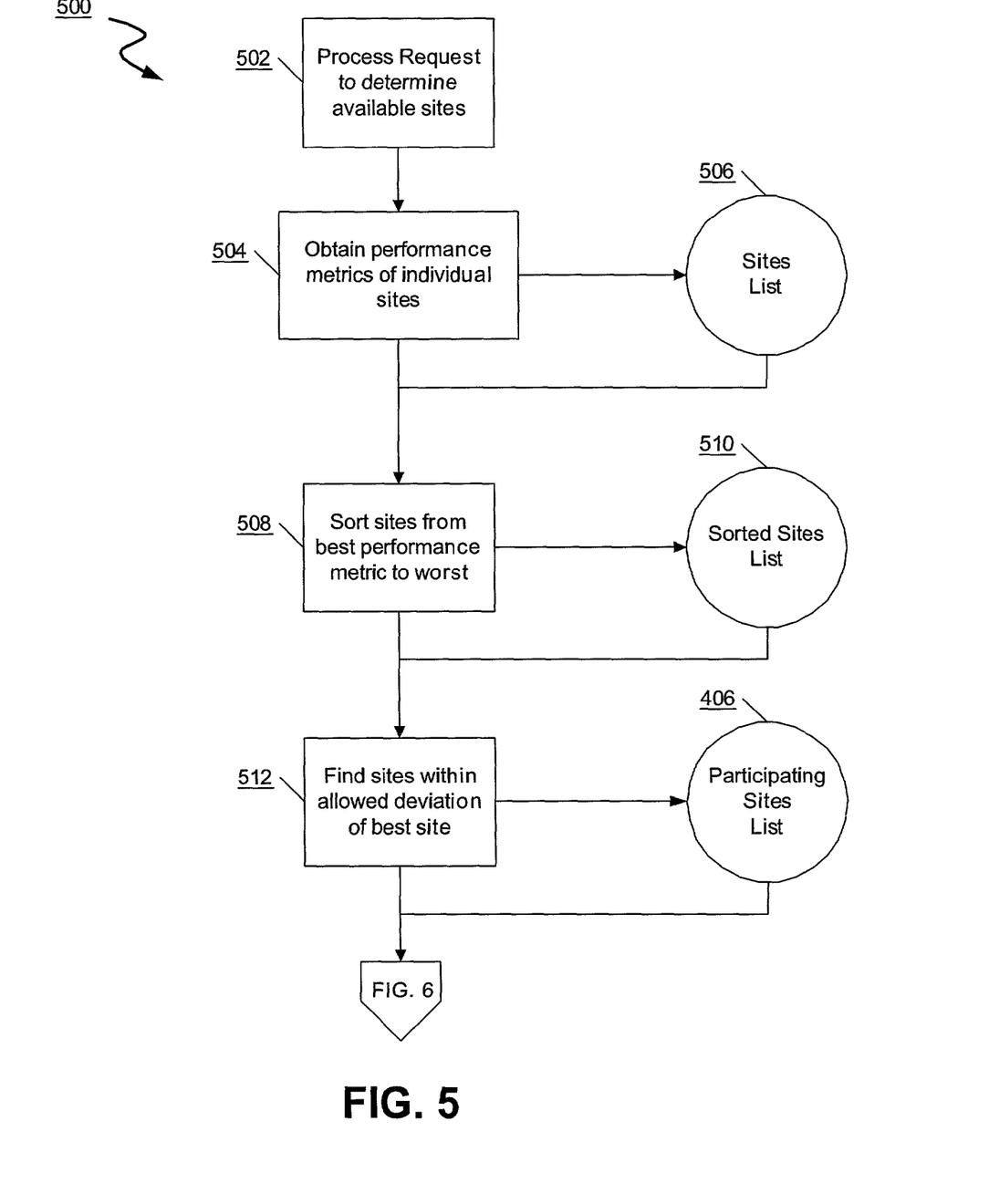
FIG. 5 is a flow diagram illustrating selected aspects of a method to be performed by a computing device executing one embodiment of the illustrated invention shown in FIG. 3.
Figure 6:
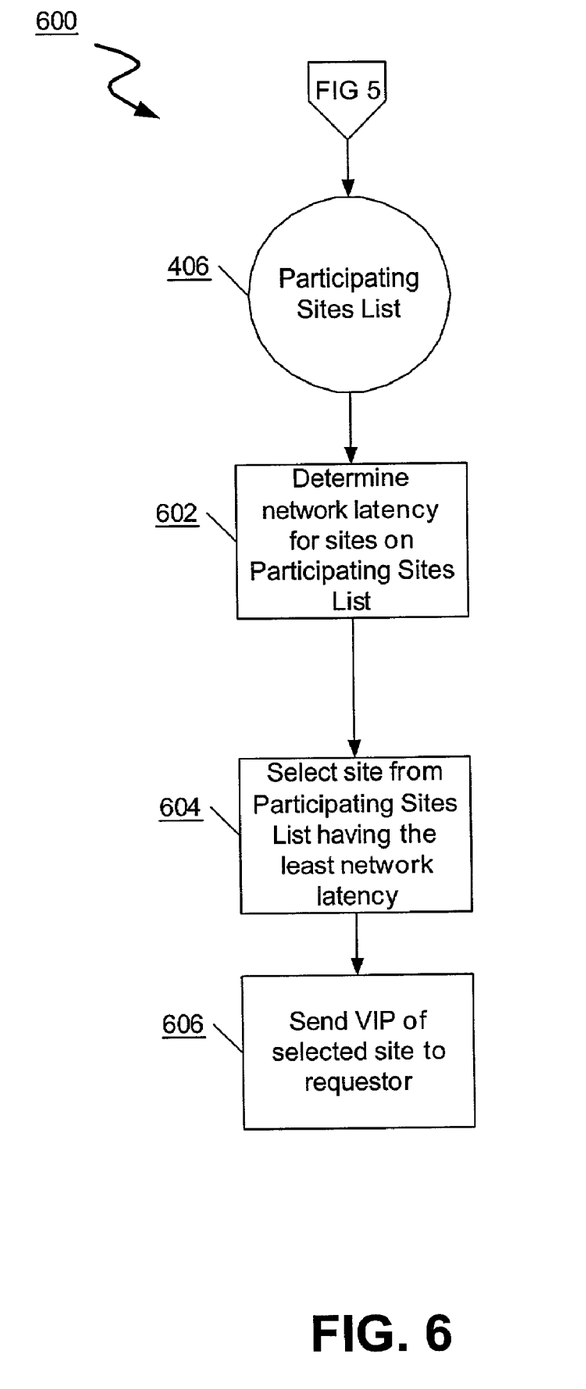
FIG. 6 is a flow diagram illustrating selected aspects of a method to be performed by a computing device executing one embodiment of the illustrated invention shown in FIG. 3.

Turning now to FIGS. 4-6, the particular methods of the invention are described in terms of computer software with reference to a series of flow diagrams. The methods to be performed by a computer constitute computer programs made up of computer-executable instructions. Describing the methods by reference to a flow diagram enables one skilled in the art to develop such programs including such instructions to carry out the methods on suitably configured computers (the processor of the computer executing the instructions from computer-accessible media). The computer-executable instructions may be written in a computer programming language or may be embodied in firmware logic, or in microengine code, or the like. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, and the like), as taking an action or causing a result. Such expressions are merely a shorthand way of saying that execution of the software by a computer causes the processor of the computer to perform an action or produce a result.

FIG. 4 is a flow diagram illustrating selected aspects of a method to be performed by a computing device executing one embodiment of the illustrated invention shown in FIG. 3. At process block 402, a client name server 104 receives a query from a client 102 for access to a particular URL. In one embodiment, the query is in the form of a DNS request. The client name server 104 send the DNS request to a single multi-site load balancer to determine which of the available sites will participate in the ultimate determination of which site is best able to satisfy the request. At processing block 404 the single multi-site load balancer determines the participating sites 406 based on a first balancing method. In one embodiment the first balancing method is based on the performance metrics of the available sites, and the sites chosen to participate are the sites with the best performance metrics. In an alternate embodiment the first balancing method may be based on the network latency associated with each of the available sites relative to the client 102, in which case the sites chosen to participate are the sites with the best network latencies relative to the client 102.

When the first balancing method is based on performance metrics, then at process 404 a single multi-site load balancer will likely control the initial determination of which sites will participate in the ultimate determination of the site best able to satisfy the request. This is so because each multi-site load balancer has access to the performance metrics of all of the sites on the network for which the requested service is available.

When the first balancing method is based on network latency, then at process 404 multiple multi-site load balancers will likely participate in the initial determination of which of the available sites will participate in the ultimate determination of the site best able to satisfy the request. For example, multiple multi-site load balancers may determine participating sites based on the number of router hops from a candidate site to the client 102, or the shortest ping times from a candidate site to the client 102. It should be noted that when the network latency is based on the coordination of simultaneous responses, network latency cannot be employed as the first balancing method, because only one site would result (i.e., only one site would reach the client name server 104 and the rest of the sites would be ignored).

In one embodiment, at processing block 408, the multi-site load balancer or balancers that controlled the initial determination of participating sites 406, selects one of the sites using a second balancing method. In one embodiment, the second balancing method is based on the network latency associated with each of the participating sites 406 relative to the client 102. The participating site having the least network latency is determined as the site best able to satisfy the request. In one embodiment, the site having the least network latency is by definition the one site from the participating sites 406 whose response reaches the client name server 104 first. In an alternate embodiment the second balancing method may be based on the performance metrics of the participating sites 406, and the multi-site load balancer will select the site having the best performance metric from the participating sites 406 as the site best able to satisfy the request. When the first balancing method was based on performance metrics, the second balancing method may be based on a different performance metric than the first.

At processing block 410, the selected site is communicated to the client 102. In one embodiment, the selected site is communicated by sending from the domain name server of the multi-side load balancer responding to the request, an identifying information of the selected site to the client name server 104 serving the client 102 that initiated the request. In one embodiment, the identifying information of the selected site is a VIP, or virtual internet protocol address, although other information may be used without departing from the scope of the invention.

FIG. 5 is a flow diagram illustrating selected aspects of a method to be performed by a computing device executing one embodiment of the illustrated invention shown in FIG. 3. At processing block 502, the multi-site load balancer 110 processes a request to determine available sites based on a first balancing method. When the first balancing method is based on performance metrics, at processing block 504 the multi-site load balancer obtains the performance metrics of each of the individual sites and compiles a site list 506. At processing block 508, the multi-site load balancer orders the site list 506 to distinguish those sites having the best performance metrics from those having the worst performance metrics. In one embodiment, the multi-site load balancer creates an ordered list of all the available sites in the order of preference that would have been employed had were purely performance metrics been used to determine the site best able to satisfy the request. In one embodiment, the multi-site load balancer orders the sites by sorting them from best performance metric to worst performance metric into a sorted site list 510. At processing block 512, the multi-site load balancer compiles those sites on sorted sites list 510 that have performance metrics that are found to be within an allowed deviation of the best performance metric to the participating sites list 406. The multi-site load balancer chooses the site with the best metrics as the standard, and compares each of the other sites to that standard. When the deviation of metric values is within a user-defined threshold (i.e., within an allowed deviation), the multi-site load balancer adds that site to the participating sites list 406. The sites on the participating sites list 406 will participate in the network latency balancing response described in FIG. 6 in further detail.

FIG. 6 is a flow diagram illustrating selected aspects of a method to be performed by a computing device executing one embodiment of the illustrated invention shown in FIG. 3. In one embodiment, the balancing process continues and the multi-site load balancer 110 employs a second balancing method different from the first balancing method to determine the site best able to satisfy the request of the client 102. In the illustrated embodiment, the second balancing method is a network latency based balancing method performed in coordination with multi-site load balancers 116 and 124.

In one embodiment, at processing block 602 the multi-site load balancer 110 determines the network latency for each of the sites on the participating site list 406. In one embodiment, when network latency is based on coordination of simultaneous responses, then at processing block 604, the client name server 104 accepts the first DNS response as identifying the site having the least network latency. In other words, the domain name servers of the multi-site load balancers on all of the sites on the participating site list 406 send their coordinated responses back to the client's name server 104, and the fastest responding site wins just as when only network latency balancing is used to determine the site best able to satisfy the request. The client 102 can then initiate a connection to the identified site and processing blocks 604 and 606 are unnecessary. In the meantime, the client name server 104 discards the subsequent responses from the rest of the participating sites.

It is understood by one of ordinary skill in the art that other methods of determining the site with the least network latency relative to the client may be used without departing from the scope of the invention. For example, in some cases it may be sufficient to implement network latency by counting the number of router hops from the responding site to the client name server 104, or by pinging the client name server 104 from the site. However, neither counting router hops or pinging is always indicative of the actual network latency. For example, router hops are not always indicative of the actual congestion that might be occurring between the hops. Pinging may be difficult and time-consuming way to get an accurate measure of the actual packet transit time between each potential site and the client 102.

Nevertheless, when network latency balancing is based on counting the number of router hops, pinging, or other more conventional forms of network latency, then at processing block 604, the multi-site load balancer or balancers selects the site best able to satisfy the request, and at processing block 606, sends VIP information or other information identifying that site to the client name server 104, so that the client 102 may initiate a connection to the identified site.

It is understood by one of ordinary skill in the art that the order of applying the balancing methods described in FIGS. 5 and 6, may be reversed without departing from the scope of the invention, as long as the first balancing method is capable of identifying at least two sites to participate in the second balancing method which will ultimately determine the site best able to satisfy the client's request. There are likely performance advantages when the first balancing method can be performed on a single multi-site load balancer to make the initial determination of participating sites, as is the case with performance metrics-based load balancing or some of the conventional network latency balancing.

Moreover, the type of performance metric used in the application of the performance metric balancing based determination of the participating or best sites may vary without departing from the scope of the invention. Likewise, the type of network latency used in the application of the network latency balancing based determination of the participating sites or best site may vary without departing from the scope of the invention.

Figure 7:
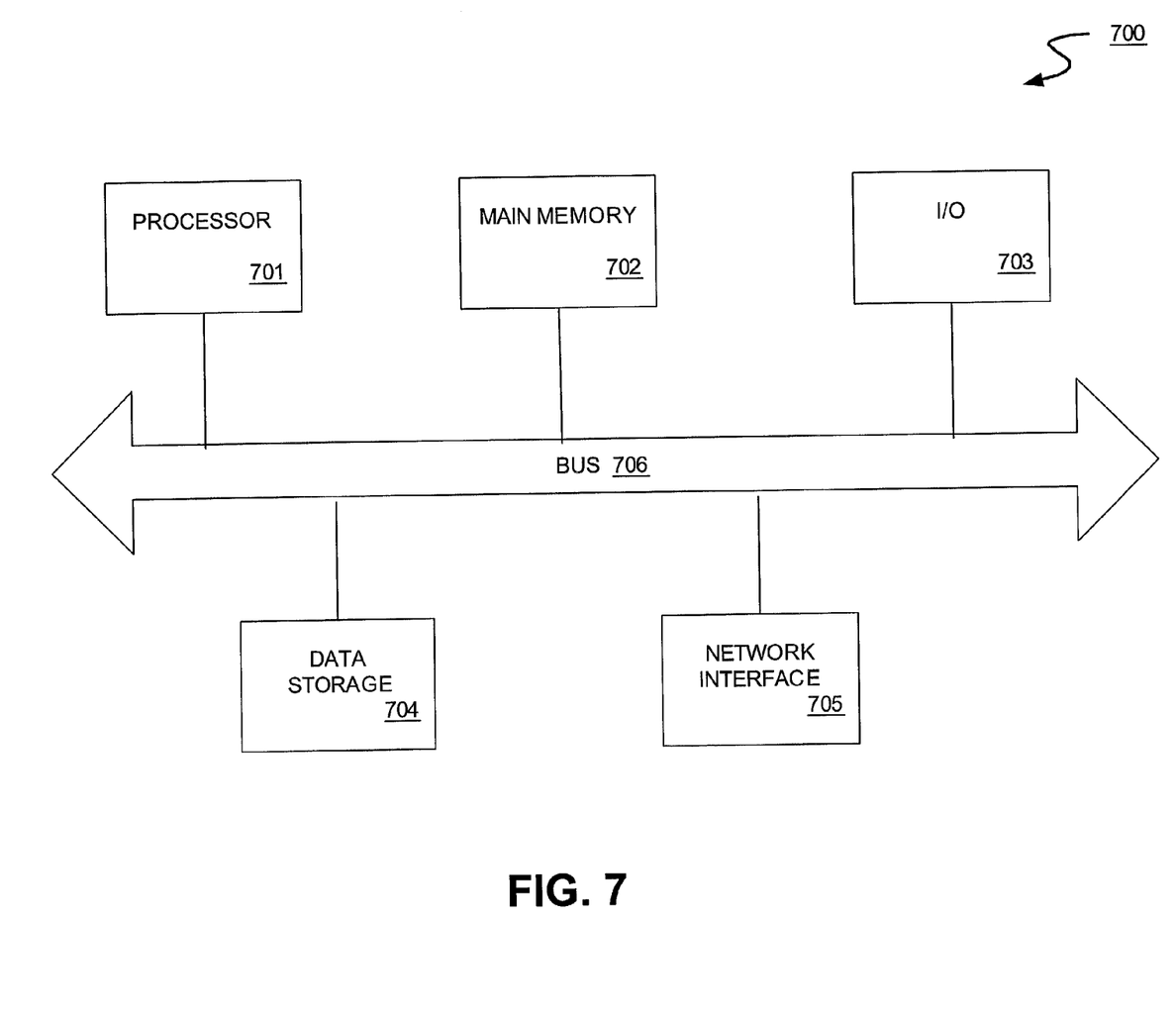
FIG. 7 is a block diagram illustrating one generalized embodiment of a computer system in which certain aspects of the invention illustrated in FIGS. 3-6 may be practiced.

FIG. 7 illustrates one embodiment of a suitable computing environment in which certain aspects of the invention illustrated in FIGS. 3-6 may be practiced. In one embodiment, the system for multi-site load balancing 300 may be implemented on a computer system 700 having components 701-706, including a processor 701, a memory 702, an Input/Output device 703, a data storage 704, and a network interface 705, coupled to each other via a bus 708. The components perform their conventional functions known in the art and provide the means for implementing the system for multi-site load balancing 300. Collectively, these components represent a broad category of hardware systems, including but not limited to general purpose computer systems and specialized network devices, including routers, domain name servers, and the like.

In one embodiment, the memory component 702, may include one or more of random access memory (RAM), and nonvolatile storage devices (e.g., magnetic or optical disks) on which are stored instructions and data for use by processor 701, including the instructions and data that comprise the client 102, client name server 104, multi-site load balancers A, B, and C 110/116/122, LAN load balancers A,B, and C 112/118/124, and other components of the multi-site load balancing system 300.

In one embodiment, the network interface component 705 may include the means for communicating to the Internet 106 from routers A, B, and C, 112/114/120 with client 102 and client name server 104. The data storage component 704 may also represent the performance metrics 113/119/125 obtained by the multi-site load balancers A, B, and C 110/116/124, and any other storage areas such as packet buffers, etc., used by the routers A, B, and C 108/114/120, client 102 and client name server 104 for transmitting and receiving DNS requests, responses and other messages.

It is to be appreciated that various components of computer system 700 may be rearranged, and that certain implementations of the present invention may not require nor include all of the above components. Furthermore, additional components may be included in system 700, such as additional processors (e.g., a digital signal processor), storage devices, memories, network/communication interfaces, etc.

In the illustrated embodiment of FIG. 7, the method and apparatus for a multi-site load balancing system 300 in accordance with one embodiment of the invention as discussed above may be implemented as a series of software routines executed by computer system 700. The software routines may comprise a plurality or series of instructions, code sequences, configuration information, or other data to be accessed and/or executed by a processing system such as one or more of processor 701. Initially, the series of instructions, code sequences, configuration information, or other data may be stored on a data storage 704 and transferred to memory 702 via bus 708. It is to be appreciated that the series of instructions, code sequences, configuration information, or other data can be stored a data storage 704 using any conventional computer-readable or machine-accessible storage medium, such as a diskette, CD-ROM, magnetic tape, DVD, ROM, etc. It is also to be appreciated that the series of instructions, code sequences, configuration information, or other data need not be stored locally, and could be stored on a propagated data signal received from a remote storage device, such as a server on a network, via a network/communication interface 705. The instructions, code sequences, configuration information, or other data may be copied from the data storage 704, such as mass storage, or from the propagated data signal into a memory 702 and accessed and executed by processor 701.

In alternate embodiments, the present invention is implemented in discrete hardware or firmware. For example, one or more application specific integrated circuits (ASICs) could be programmed with some or all of the above-described functions of the present invention.

Accordingly, a novel method and system is described for a method and apparatus for a multi-site load balancing system 300. From the foregoing description, those skilled in the art will recognize that many other variations of the present invention are possible. In particular, while the present invention has been described as being implemented in a network comprising one or more routers 108/114/120 connecting sites having multi-site load balancers A, B, and C 110/116/124, and LAN load balancers A, B, and C 112/118/124 to client 102 and client name server 104 via Internet 106, some of the logic may be distributed in other components of a network or internetwork application. Thus, the present invention is not limited by the details described. Instead, the present invention can be practiced with modifications and alterations within the spirit and scope of the appended claims.

What is claimed is:

1. A method, comprising: receiving a single DNS (Domain Name Service) request from a client's Domain Name Server; in response to the single DNS request from the client's Domain Name Server, applying a series of load balancing methods, wherein the series of load balancing methods includes a first load balancing method and a second load balancing method to be performed after the first load balancing method, wherein: the first load balancing method is based on at least one performance metric of respective Domain Name Service servers available to respond to the single DNS request; the second load balancing method comprises coordinating multiple ones of the Domain Name Service servers available to respond to the DNS request, to respond to the single DNS request at the same time by simultaneously sending, to the client's Domain Name Server, DNS responses to the single DNS request; wherein the first load balancing method comprises determining a strict subset of the sites available to respond to the DNS request; and wherein the multiple sites of the second load balancing method are the strict subset of the sites.

2. The method of claim 1,
wherein the sites available comprise more than one site having a Local Area Network (LAN) load balancer.

3. An article of manufacture comprising a non-transitory machine-accessible medium having a program which when accessed by a machine cause the machine to: receive a single DNS (Domain Name Service) request from a client's Domain Name Server; in response to the single DNS request from the client's Domain Name Server, apply a series of load balancing methods, wherein the series of load balancing methods includes a first load balancing method and a second load balancing method to be performed after the first load balancing method, wherein:
the first load balancing method is based on at least one performance metric of respective Domain Name Service servers available to respond to the single DNS request; the second load balancing method comprises coordinating multiple ones of the Domain Name Service servers available to respond to the single DNS request, to respond to the single DNS request at the same time by simultaneously sending, to the client's Domain Name Server, DNS responses to the single DNS request; wherein the first load balancing method comprises determining a strict subset of the sites available to respond to the DNS request; and wherein the multiple sites of the second load balancing method are the strict subset of the sites.

4. The method of claim 3,
wherein the sites available comprise more than one site having a Local Area Network (LAN) load balancer.

* * * * *